(12) United States Patent
An

(10) Patent No.: US 7,647,529 B2
(45) Date of Patent: Jan. 12, 2010

(54) DISPLAY APPARATUS HAVING ELECTRONIC ALBUM FUNCTION AND METHOD THEREOF

(75) Inventor: Byung Soo An, Daegu (KR)

(73) Assignee: LG Electronics Inc., Seoul (KR)

( * ) Notice: Subject to any disclaimer, the term of this patent is extended or adjusted under 35 U.S.C. 154(b) by 467 days.

(21) Appl. No.: 11/525,126

(22) Filed: Sep. 22, 2006

(65) Prior Publication Data

US 2007/0174725 A1 Jul. 26, 2007

(30) Foreign Application Priority Data

Dec. 12, 2005 (KR) ............... 10-2005-0121798

(51) Int. Cl.
*G06F 11/00* (2006.01)
(52) U.S. Cl. ............... 714/43; 714/34; 714/42; 714/748
(58) Field of Classification Search ............ 714/34, 714/42, 43, 748
See application file for complete search history.

(56) References Cited

U.S. PATENT DOCUMENTS 7,107,346 B2 * 9/2006 Boyd .................. 709/227

2003/0123389 A1 * 7/2003 Russell et al. ............. 370/230
2003/0206194 A1 11/2003 Boyd
2005/0012758 A1 * 1/2005 Christou .................. 345/619

* cited by examiner

*Primary Examiner*—Robert Beausoliel
*Assistant Examiner*—Charles Ehne
(74) *Attorney, Agent, or Firm*—Birch, Stewart, Kolasch & Birch, LLP

(57) ABSTRACT

A display device having electronic album function and the method thereof is disclosed. The present invention includes an Electronic Photo Frame (EPF) controller which checks the existence of the memory and reads image data from the memory if any, an interface device which converts the interface format of the image data from the EPF controller, transmits it to main controller and sends interrupts to the main controller when there is a transmission error, and a counter which counts the number of interrupts transmitted to the main controller. When the number of interrupts with the same clock exceeds a predetermined number, the main controller ignores the interrupts, resets the interface device and reloads the image data from the memory. Otherwise, the main controller performs the regular interrupt routine.

8 Claims, 5 Drawing Sheets

DISPLAY APPARATUS HAVING ELECTRONIC ALBUM FUNCTION AND METHOD THEREOF

This application claims the benefit of Korean Patent Application No. 10-2005-0121798, filed on Dec. 12, 2005, which is hereby incorporated by reference.

BACKGROUND OF THE INVENTION

1. Field of the Invention

The present invention relates to a display device, and more particularly, to a display device having electronic album function and method thereof.

2. Discussion of the Related Art

The function of Electronic album (or Electronic Photo Frame: EPF) is to substitute traditional paper albums by storing lots of photo frames in the memory device and displaying the stored photo frames when needed, thereby reading, writing, storing or displaying digital photo frames stored in the memory device or through data communication directly/indirectly with nearby peripherals such as Television (TV), Personal Computer (PC), Personal Data Assistant (PDA) and Portable Multimedia Player (PMP), etc. Moreover, the function of the electronic album is added to more and more display devices, which can be set to display video data captured from broadcasting programs, thumbnail images from internal/external memory devices, slides, or full screens.

FIG. 1 shows a block diagram of a traditional display device having electronic album function. An antenna (101) receives specific broadcasting signals in a tuned frequency range. The tuner/IF (102) demodulates IF signals from the received broadcasting signals. The switch (103) chooses one of the signals from the tuner/IF (102) and external devices. The tone controller (104) controls the tone of the audio signals from the signals chosen by the switch (103). The amp (105) amplifies the output of the tone controller (104) and sends the amplified signals to the speaker (106). The chroma processor (111) adjusts colors of the characters and icons of the signals from the switch (103) to be displayed on the display device. The power supply (107) provides powers to all elements of the device. The main controller (109) receives power from the power supply (107) and outputs a corresponding control signal according to an input from the remote control (108). The format converter (112) converts signals from the chroma processor (111) to displayable signals. The image amp (113) amplifies the signals from the format converter (112). The deflection controller (114) adjusts deflections of the amplified image signals from the image amp (113). The display (115) displays the inclined image signals from the deflection controller (114).

The EPF controller (118) checks whether there is a memory and reads stored image data from the memory (119) if any. The interface (116) transfers the image data from the memory (119) to the main controller (109) as well as requesting an interrupt to the main controller (109).

FIG. 2 is a flowchart for operating the traditional display device having electronic album function. First of all, when a user sends a command using a remote control (108), the power supply (107) provides powers to all elements of the device and the main controller (109) sends a control signal to the tuner/IF (102) to select a channel chosen by the user.

Now, operations of the traditional display device having electronic album function are explained. After a user turns on the display device (S101), the main controller checks if the user selects the electronic album function (S102). If the user selects the electronic album function while executing a regular operation (e.g., displaying broadcasting program) (S103), the main controller (109) displays a list of pictures read from the memory (119) (S104). It is recommended to display it as thumbnail images. The main controller checks if the user selects a certain picture (S105). If the user selects a picture, the main controller (109) loads the picture from the memory (119) (S106). Then, the controller (S10) checks if the loading is finished (S107). The controller displays the loaded picture on the display (S108). However, if the selected picture is not successfully loaded from the memory (119), the interface (116) periodically sends an interrupt signal to the main controller (109) (S109), thereby locking up the main controller (109) (S110).

The traditional display device having the electronic album function explained above checks whether there is a memory if the image data is not loaded within predetermined time. The controller recognizes it if there is actually no memory present. When it is totally impossible to read the image data from the memory even though there is a memory, the controller stops the reading operation realizing that the memory has a defect. But, when the controller cannot read the image data from the memory due to noise or cable vibration, etc., or the controller lost the image data due to the other commands from the user, the interface continuously sends an interrupt signal to the main controller (109) resulting lockup of the device.

Therefore, it is highly desired to develop a display device having an electronic album function which prevents from malfunctions such as the device lockup by sensing irregular interrupts, resets the corresponding element, and quickly restarts the device.

SUMMARY OF THE INVENTION

Accordingly, the present invention is directed to a display apparatus having electronic album function and method thereof that substantially obviates one or more problems due to the limitations and disadvantages of the related art.

An object of the present invention is to provide an apparatus and method for avoiding a system lockup due to continuous interrupts.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method is disclosed for preventing a device lockup in a display device having an electronic album function comprising checking existence of a memory and reading image data from the memory if any, converting the interface format of the image data from a Electronic Photo Frame (EPF) controller, transmitting the image data to a main controller and sending interrupts to the main controller when there is a transmission error, and counting the number of interrupts transmitted to the main controller, wherein when the number of interrupts with the same clock exceeds a predetermined number, the main controller ignores the interrupts, resets the interface device and reloads the image data from the memory.

In another aspect of the present invention, A display device having an electronic album function is provided that comprises an Electronic Photo Frame (EPF) controller which checks the existence of a memory and reads image data from the memory if any, an interface device which converts an interface format of the image data from the EPF controller, transmits the converted interface format to a main controller and sends interrupts to the main controller when there is a transmission error, and a counter which counts a number of interrupts transmitted to the main controller, wherein when the number of interrupts with the same clock exceeds a predetermined number, the main controller ignores the interrupts, resets the interface device and reloads the image data from the memory.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Figure 1:
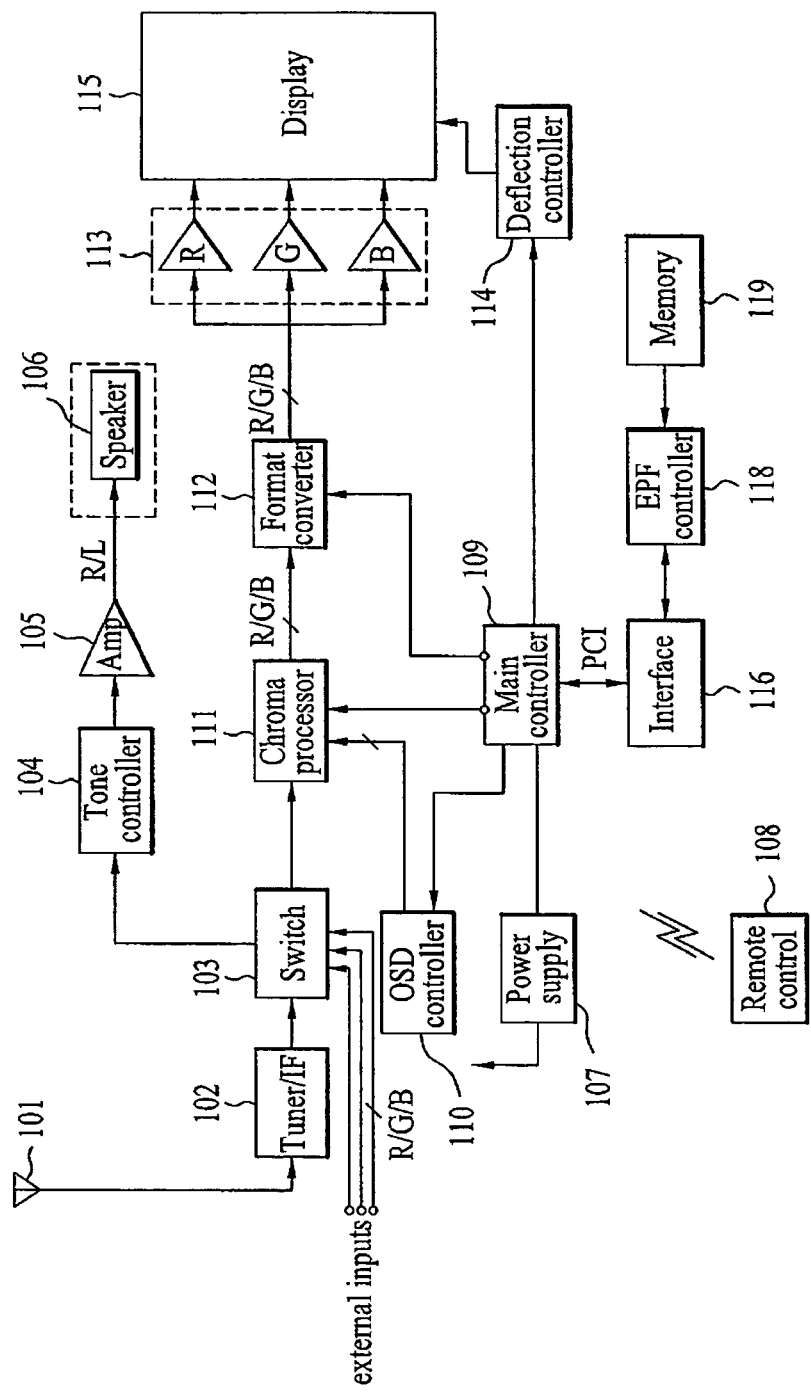
FIG. 1 illustrates a block diagram of a traditional display device having electronic album function.
Figure 2:
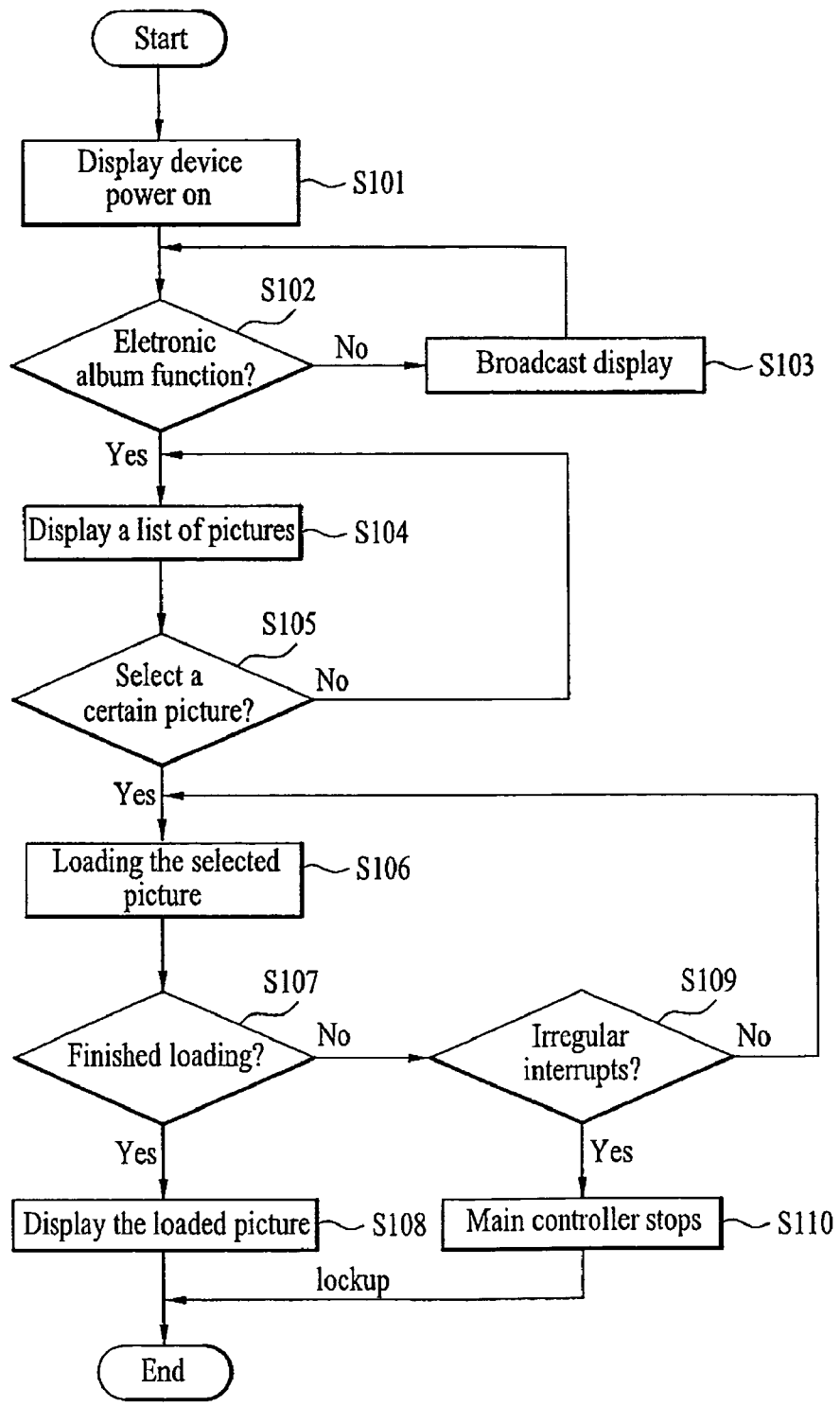
FIG. 2 illustrates a flowchart for operating the traditional display device having electronic album function according to the embodiment of FIG. 1.
Figure 3:
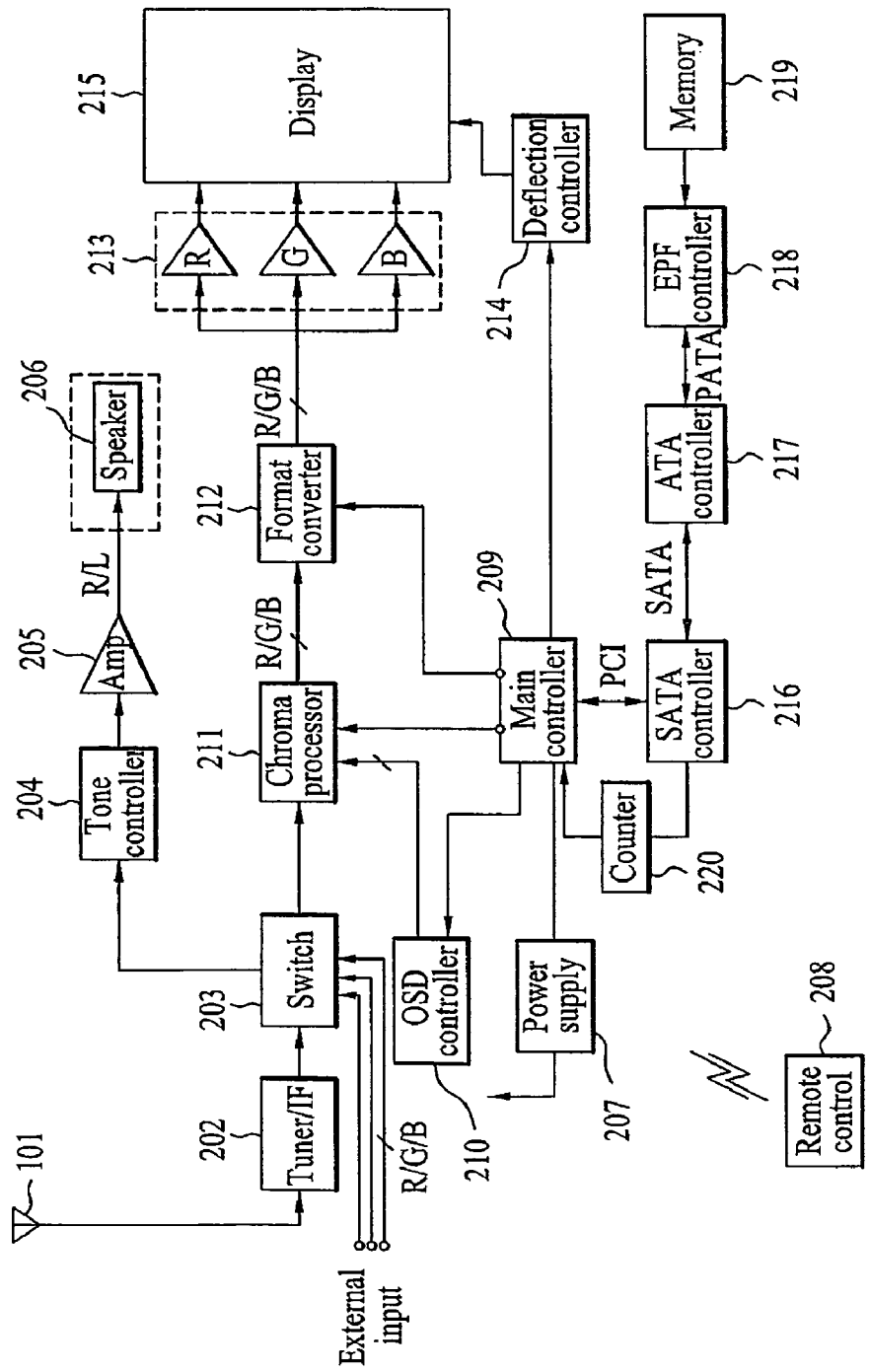
FIG. 3 illustrates a block diagram of a display device having electronic album function according to the present invention.

FIG. 3 shows a block diagram of a display device having electronic album function according to the present invention.

An antenna (101) receives specific broadcasting signals in the chosen frequency range. The tuner/IF (202) demodulates the IF from the received broadcasting signals. The switch (203) chooses one of the signals from the tuner/IF (202) or external devices. The tone controller (204) controls the tone of the audio signals from the signals chosen by the switch (203). The amp (205) amplifies the output of the tone controller (204) and sends the amplified signals to the speaker (206). The chroma processor (211) adjusts colors of the characters and icons of the signals from the switch (203) to be displayed on the display device. The power supply (207) provides powers to all elements of the device. The main controller (209) receives power from the power supply (207) and outputs a corresponding control signal according to an input from the remote (208). The format converter (212) converts signals from the chroma processor (211) to displayable signals. The image amp (213) amplifies the signals from the format converter (212). The inclination controller (214) adjusts the inclinations of the amplified image signals from the image amp (213). The display (215) displays the inclined image signals from the inclination controller (214).

The EPF controller (218) checks whether there is a memory and reads stored image data from the memory (119), if any. The Serial Advanced Technology Attachment (SATA) controller (216) transfers the image data from the memory (219) to the main controller (209) as well as requesting an interrupt to the main controller (209). The counter (220) counts the number of interrupts from the interface device (216, 217) to the main controller (209). When the number of interrupts with the same clock exceeds the predetermined number, the main controller (209) ignores the interrupts, resets the interface device (216, 217), and reloads the image data from the memory (219).

The interface device includes an Advanced Technology Attachment (ATA) converter (217) which converts the Parallel Advanced Technology Attachment (PATA) interface format from the EPF controller (218) to the Serial Advanced Technology Attachment (SATA) interface format, and an SATA controller (216) which transmits the image data as the SATA interface format to the main controller (209) as well as requesting an interrupt to the main controller (209).

The PATA is a connection interface of the parallel transmission and the SATA is a connection interface of the high speed serial transmission. The display (215) displays the process of reloading as characters or symbols.

Figure 4:
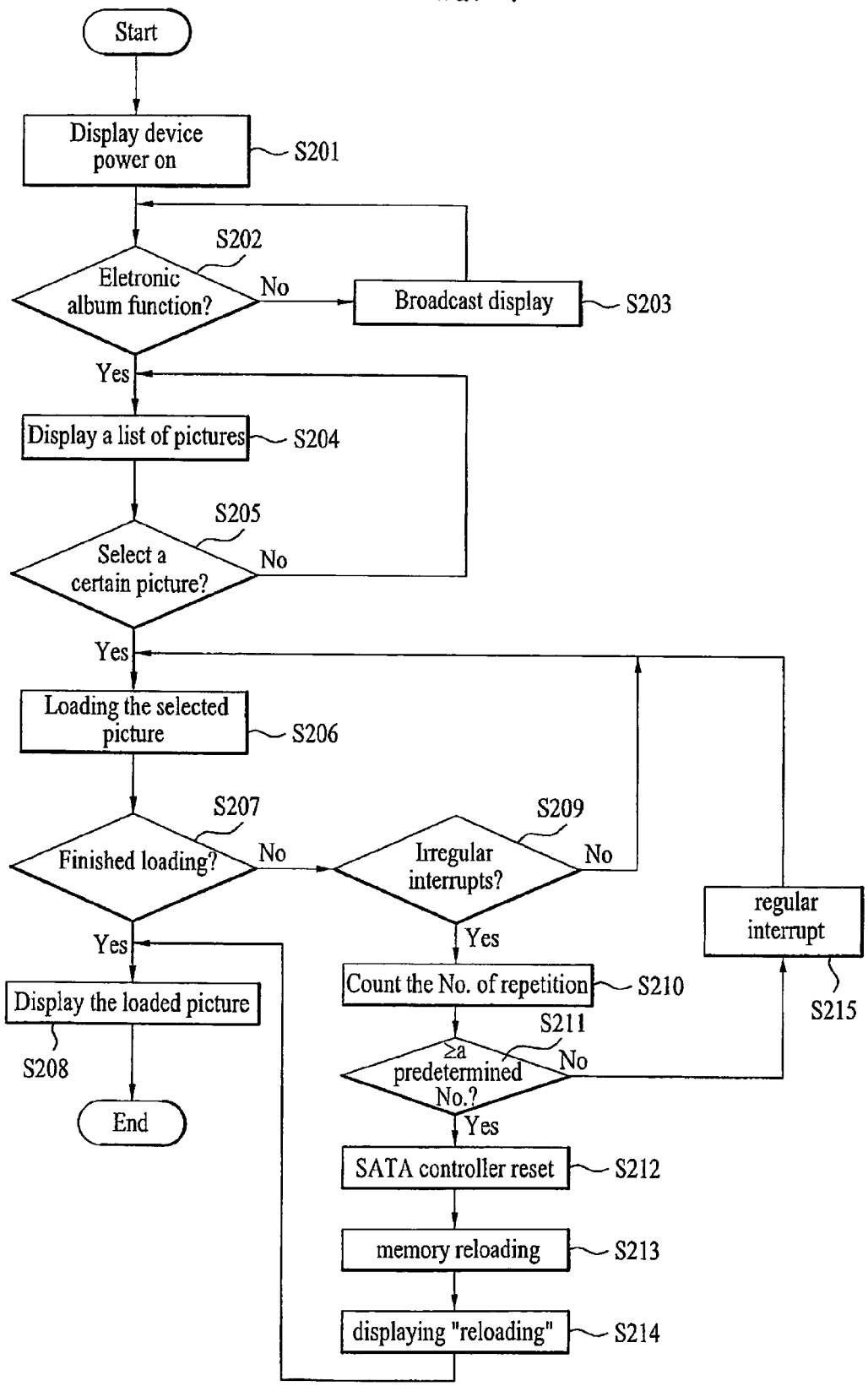
FIG. 4 illustrates a flowchart for operating the display device having electronic album function according to the embodiment of FIG. 3.

FIG. 4 illustrates a flowchart for operating the display device having electronic album function according to the present invention. First of all, when a user sends a command using the remote control (208), the power supply (207) provides powers to all elements of the device and the main controller (209) sends a control signal to the tuner/IF (202) to select a channel chosen by the user.

A user turns on the display device (S201). The main controller checks if the user selects the electronic album function (S202). If the user selects the electronic album function while executing a regular operation (e.g., displaying broadcasting program) (S203), the main controller (209) displays a list of pictures read from the memory (219) (S204). It is recommended to display it as thumbnail images. The main controller checks if the user selects a certain picture (S205). If the user selects a certain picture, the main controller (209) loads the picture from the memory (219) (S206). Then, the controller (209) checks if the loading is finished (S207). The controller displays the loaded picture on the display (S208). However, if the selected picture is not successfully loaded from the memory (219), the SATA controller (216) periodically sends an interrupt signal to the main controller (209) (S209).

In other words, the EPF controller (218) checks if there is a memory (219) and reads the image data from the memory (219) if any. The ATA converter (217) converts the interface format of the image data from PATA format to SATA format. When there is a transmission error, the SATA controller (216) sends an interrupt signal to the main controller (209) as well as transmitting the image data in the SATA format from the ATA converter (217) to the main controller (209). It is recommended that the interface type between the SATA controller (216) and the main controller (209) be a PCI type.

Accordingly, the counter (220) counts the number of interrupts (S210). When the number of interrupts with the same clock exceeds a predetermined number (S211), the main controller (209) ignores the interrupts, resets the interface device (216, 217) (S212) and reloads the image data from the memory (S213). Otherwise, the main controller (209) performs the regular interrupt routine (S215).

Figure 5A:
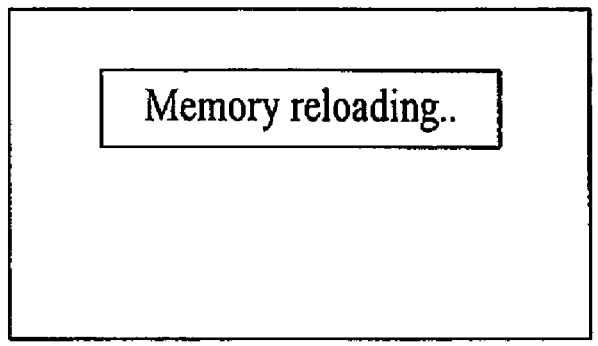
FIGS. 5A & 5B illustrate a display screen of a display device having electronic album function according to the present invention.
Figure 5B:
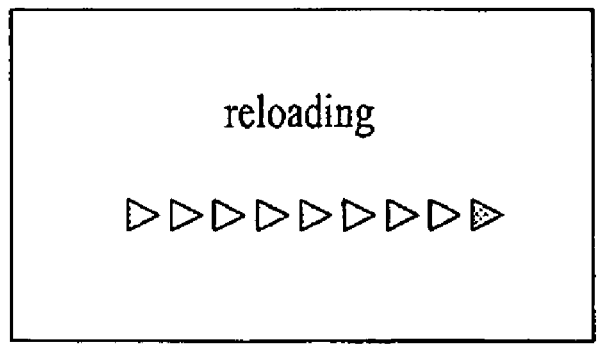

When the display (215) displays the process of reloading the image data as characters and symbols, it is recommended to display characters such as shown in FIG. 5a and symbols such as shown in FIG. 5b.

The image data is stored in the memory (219) classified by folders such as birthdays, marriages, graduations, etc. Surely, a user can create a new folder and put names of persons on the above anniversaries and select corresponding audios and videos. A user also can type a text message on the image data and set the date when the image data and the text message are outputted.

While the invention has been described with respect to the physical embodiments constructed in accordance therewith, it will be apparent to those skilled in the art that various modifications, variations and improvements of the present invention can be made without departing from the spirit or scope of the inventions. Thus, it is intended that the present invention covers the modifications and variations of this invention provided they come within the scope of the appended claims and their equivalents.

What is claimed is:

1. A method for preventing a device lockup in a display device having an electronic album function comprising:
    displaying a list of image data read from a memory if a user selects the electronic album function while displaying a broadcasting program;
    checking existence of a memory if the user selects the electronic album function and reading the selected image data from the memory if any;
    converting the interface format of the image data from a Electronic Photo Frame (EPF) controller, transmitting the image data to a main controller and sending interrupts to the main controller when there is a transmission error; and
    counting the number of interrupts transmitted to the main controller,
    wherein when the number of interrupts with a same clock exceeds a predetermined number, the main controller ignores the interrupts, resets the interface device and reloads the image data from the memory.

2. The method of claim 1, wherein a process of reloading the image data is displayed as characters or symbols.

3. The method of claim 1, further comprising:
    converting a Parallel Advanced Technology Attachment (PATA) interface format from the EPF controller to a Serial Advanced Technology Attachment (SATA) interface format; and
    transmitting the image data as the SATA interface format to the main controller as well as requesting an interrupt to the main controller.

4. The method of claim 1, wherein the EPF controller checks whether there is a memory and reads stored image data from the memory, if any.

5. The method of claim 4, wherein the Serial Advanced Technology Attachment (SATA) controller transfers the image data from the memory to the main controller as well as requesting interrupts to the main controller.

6. A display device having an electronic album function comprising:
    a main controller configured to check whether a user selects the electronic album function while displaying broadcasting program, and configured to display a list of image data read from a memory;
    an Electronic Photo Frame (EPF) controller configured to check the existence of a memory if the user selects the electronic album function and reads the selected image data from the memory if any;
    an interface device configured to convert an interface format of the image data from the EPF controller, transmits the converted interface format to a main controller and sends interrupts to the main controller when there is a transmission error; and
    a counter configured to count a number of interrupts transmitted to the main controller,
    wherein when the number of interrupts with a same clock exceeds a predetermined number, the main controller is configured to ignore the interrupts, to reset the interface device and to reload the image data from the memory.

7. The display device of claim 6, wherein a process of reloading the image data is displayed as characters or symbols.

8. The display device of claim 6, wherein the interface device further comprising: a Advanced Technology Attachment (ATA) converter which converts the Parallel Advanced Technology Attachment (PATA) interface format from the EPF controller to the Serial Advanced Technology Attachment (SATA) interface format, and an SATA controller which transmits the image data as the SATA interface format to the main controller as well as requesting an interrupt to the main controller.

* * * * *